United States Patent
Tanikawa

[11] Patent Number: 5,838,929
[45] Date of Patent: *Nov. 17, 1998

[54] UPGRADE CPU MODULE WITH INTEGRAL POWER SUPPLY

[75] Inventor: Roy K. Tanikawa, Irvine, Calif.

[73] Assignee: AST Research, Inc., Irvine, Calif.

[*] Notice: This patent issued on a continued prosecution application filed under 37 CFR 1.53(d), and is subject to the twenty year patent term provisions of 35 U.S.C. 154(a)(2).

[21] Appl. No.: 457,531

[22] Filed: Jun. 1, 1995

[51] Int. Cl.[6] .................................................... G06F 13/00
[52] U.S. Cl. .......................... 395/282; 395/283; 395/555; 395/180; 395/182.12; 395/750.08
[58] Field of Search .............................. 395/750.08, 550, 395/500, 555, 307, 180, 182.12, 282, 283; 364/707

[56] References Cited

U.S. PATENT DOCUMENTS

| | | |
|---|---|---|
| 4,615,005 | 9/1986 | Maejima et al. . |
| 4,716,463 | 12/1987 | Stacy et al. . |
| 5,006,790 | 4/1991 | Beverly, II et al. . |
| 5,142,684 | 8/1992 | Perry et al. . |
| 5,230,074 | 7/1993 | Canova, Jr. et al. . |
| 5,297,272 | 3/1994 | Lu et al. .................................. 395/500 |
| 5,481,697 | 1/1996 | Mathews et al. . |
| 5,572,718 | 11/1996 | Scriber et al. .......................... 395/555 |

*Primary Examiner*—Meng-Ai T. An
*Assistant Examiner*—Rupal D. Dharia
*Attorney, Agent, or Firm*—Knobbe, Martens, Olson & Bear, LLP

[57] ABSTRACT

A computer processing unit (CPU) module is described. The present CPU module accommodates a CPU and includes a power supply, a power good detection circuit and a clock speed selector, all of which are integral to the CPU module. The power supply provides the CPU module the ability to convert power supplied to the CPU module to power as needed by the CPU. The power good detection circuit provides the CPU module the ability to notify the mother board of a power supply to the CPU which is below the operating voltage of the CPU (e.g. a power failure or insufficient voltage). The clock speed selector provides the CPU module the ability to automatically set the clock speed to that required by the CPU without modification to the BIOS stored on the mother board or changing components.

8 Claims, 1 Drawing Sheet

UPGRADE CPU MODULE WITH INTEGRAL POWER SUPPLY

FIELD OF INVENTION

The present invention relates to a module (or board) for a microprocessor or computer processing unit (CPU), particularly a CPU module which accommodates a CPU and which includes a power supply, a power good detection circuit and a clock speed selector integral to the module.

BACKGROUND

In improving microprocessors (i.e. computer processing units or CPUs) manufacturers change the design to make the CPUs more efficient, faster, etc. Often with such improvements and/or new designs the operating requirements of the CPUs change (e.g. the required operating voltage, the required clock speed, etc.). For example, at one time both the central core and input/output interface (I/O) of Intel® CPUs operated at 5 volts. Then certain CPUs were upgraded and both the central core and I/O interface operated at 3.3 volts. The central core and the I/O interface of a new Pentium® CPU by Intel® operates at 2.9 volts and 3.3 volts respectively. This trend of operating voltage changes as CPUs are upgraded is expected to continue. The trend of the central core and the I/O interface of a CPU requiring different voltages is also expected to continue.

Commonly when the CPU in a computer is upgraded the mother board of the computer must be manipulated to remove the existing CPU, to install a new CPU, and to accommodate the new CPU (e.g., reconfigure the mother board to adjust for different power and/or clock speed requirements, etc.). To facilitate the removal, installation, and accommodation of CPUs it is known to provide CPUs on an upgrade CPU module (or board) separate from the mother board whereby an old CPU can be removed by simple removal of the entire CPU module and a new CPU can be installed by simple installation of an upgrade CPU module.

To further facilitate the ability to upgrade a computer system through the installation of an upgraded CPU, upgrade CPU modules have been manufactured with integral power supplies to convert the voltage supplied by the mother board to the CPU from 5 volts to 3.3 volts as appropriate for the particular CPU (core and/or I/O interface) provided on the CPU module. The power supply provided on the CPU module can also convert the voltage supplied externally from an AC to DC wall adapter (18 volt DC output) or internally from a battery (12 volt DC) to 3.3. volt DC current as appropriate for the CPU core and/or I/O interface. Thus, a CPU module can be manufactured with a power supply to accommodate the CPU on the CPU module without having to change the power supply on the mother board.

However, such prior CPU modules (even those with integral power supplies) do not provide feedback information to the mother board (e.g. do not communicate that the power supply to the CPU is below the operating voltage of the CPU). Therefore, there can be sufficient power for the mother board to run and the mother board does not recognize if the power level has not stabilized sufficiently for the CPU to run (e.g., due to a module power supply failure). Therefore, the CPU can be stopped due to a power failure or insufficient voltage while the rest of the mother board continues to run without identifying the CPU power problem. Thus, a power failure message is not communicated to is the mother board prompting it to turn off the power supply and protect the rest of the mother board. This situation also can frustrate attempts to identify what is wrong with the inoperable computer.

In addition, such CPU modules (even those with integral power supplies) do not accommodate for upgrade CPUs which require a clock speed different from the clock speed for which the mother board was configured for the original CPU. While the clock speed of a computer can typically be manipulated by modifying the BIOS (typically stored on a chip on the mother board) or changing components, such modification requires the intervention of a knowledgeable person. It is beneficial if the clock speed can be automatically set at the speed required by the new CPU without manipulation of the BIOS or changing components. However, such a feature has not yet been provided.

Prior CPU modules have not provided adequate solutions to these problems.

SUMMARY OF THE INVENTION

The present invention provides a CPU module which affords solutions to the problems described above. Particularly, the present invention provides a CPU module that accommodates a CPU and includes a power supply, a power good detection circuit and a clock speed selector, all integral to the CPU module.

The power supply of the present invention provides the CPU module with the ability to convert power supplied to the CPU module by the mother board or an internal or external source into the power required by the particular CPU (e.g. AC to DC and 18, 12, 5.0, or 3.3 volts to 2.9 volts).

The power good detection circuit of the present invention provides the CPU module the ability to communicate to the mother board that the supply of power is below the operating voltage of the CPU (e.g. a power failure or insufficient voltage to the CPU).

The clock speed selector of the present invention provides the CPU module with the ability to automatically set the clock speed to that required by the particular CPU on the CPU module.

Accordingly it is a primary object of the present invention to provide an improved CPU module with an integral power supply.

It is an additional object of the present invention to provide a CPU module with an integral power good detection circuit.

It is a further object of the present invention to provide a CPU module with an integral clock speed selector.

Other objects and features of the present invention will become apparent from consideration of the following description taken in conjunction with the accompanying drawings.

DETAILED DESCRIPTION OF THE PREFERRED EMBODIMENT

Figure 1:
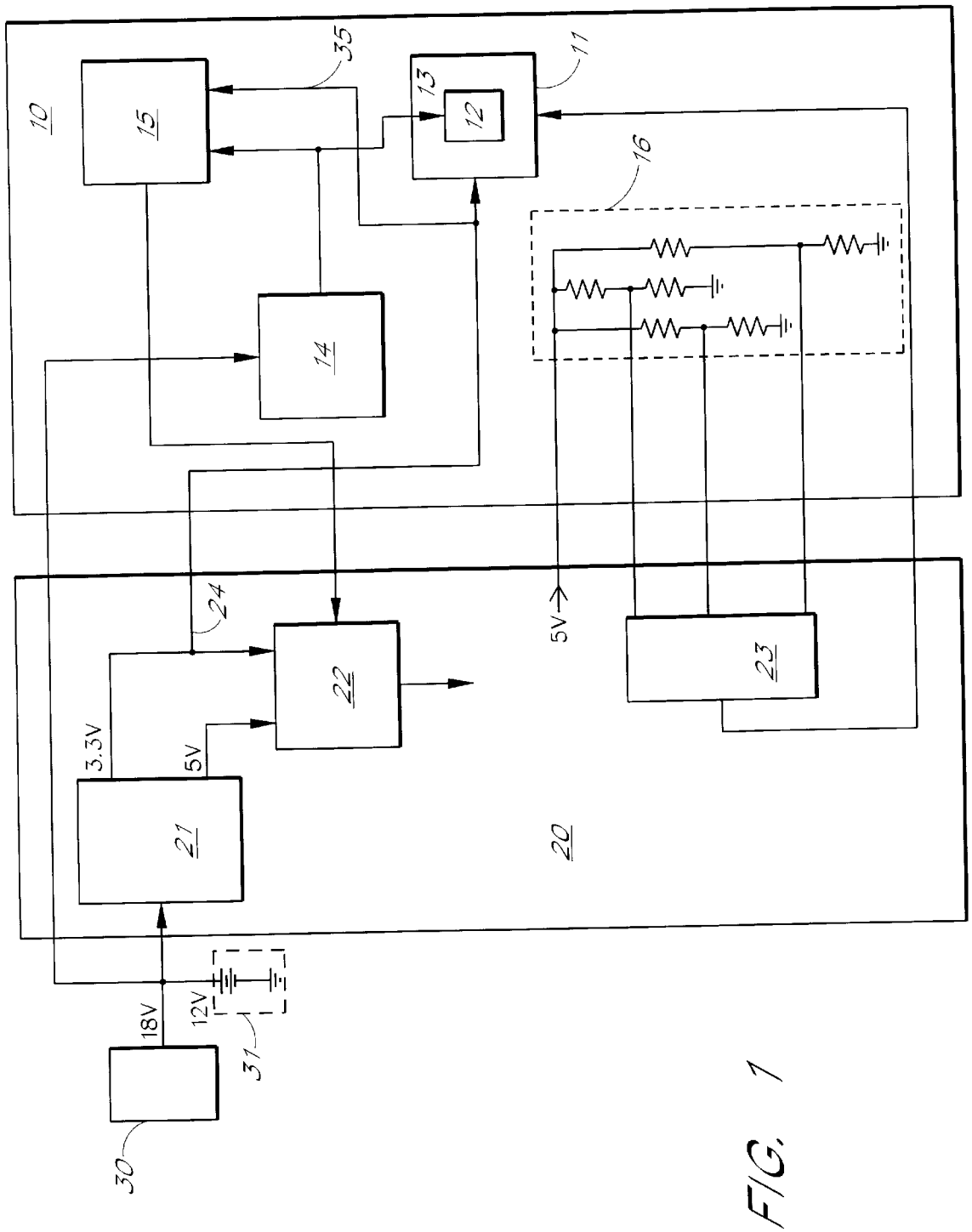
FIG. 1 is a block diagram showing the CPU module of the present invention.

As is shown in FIG. 1, the preferred embodiment of the present invention comprises a CPU module (or board) 10 which accommodates a CPU 11 (comprising a CPU core 12 and an I/O interface 13) and which includes a CPU module power supply 14, a CPU module power good detection circuit 15, and a clock speed selector 16, all of which are integral to the CPU module 10 and connectable to a mother board 20. As is described above, arranging the CPU 11 on a CPU module 10 provides a convenient mode of removing a CPU from and installing a new CPU onto a mother board.

As is also shown in FIG. 1, the mother board 20 includes a mother board power supply 21, a mother board power good detection circuit 22, and a clock 23. Although FIG. 1 shows the mother board 20 and the CPU module 10 as separate, the CPU module 10 is attachable (electrically and physically) to the mother board 20.

As is typical in the industry, the mother board 20 is supplied with power either from an external source 30 (e.g. a wall plug outlet) and/or from a battery source 31 which can be internal or external. The power is supplied to the mother board power supply 21 which then converts the power to that voltage required by the components (e.g. AC to DC and 18 volts or 12 volts to 5 volts and/or 3.3 volts). The mother board power supply 21 also provides power to the mother board power good detection circuit 22 which checks the power supplied and ensures that it is within the tolerance range of the components receiving power. Typically, if the power is below operating voltage, the power good detection circuit 22 communicates this to the mother board 20 which then, typically, indicates the same and waits until the power is sufficient. In the preferred embodiment of the present invention the mother board power supply 21 also supplies power to the I/O interface 13 of the CPU module 10, for example, via line 24 in FIG. 1.

In the preferred embodiment of the present invention, as shown in FIG. 1, the CPU module 10 is supplied power as is the mother board 20: from either an external source 30 (e.g. a wall plug outlet) and/or a battery source 31 which can be internal or external. The power is supplied to the CPU module power supply 14 which then converts the power to that voltage required by the CPU core 12 (e.g. AC to DC and 18 volts or 12 volts to 3.3 or 2.9 volts depending on the power supplied and on the particular CPU) and provides the converted power to the CPU core 12. The CPU module power supply 14 also provides power to the CPU module power good detection circuit 15 which checks the power supplied and ensures that it is within the operating voltage level of the CPU core 12. The CPU module power good detection circuit 15 communicates if the power is not at the operating voltage level to the mother board power good detection circuit 22 which then, as is described above, typically, indicates the same to the mother board 20 and waits until it is at the proper level.

As is described above, the I/O interface 13 is supplied power by the mother board power supply 21 and the power supplied by the mother board power supply 21 is checked by the mother board power good detection circuit 22. As is shown in FIG. 1, the preferred embodiment of the present invention includes a redundant check on this power supply to the I/O interface 13 by the CPU module power good detection circuit 15 via, for example, line 35. Although the power for the I/O interface 13 is preferably supplied from the mother board 20 as shown, CPU module 10 of the present invention can be configured such that the I/O interface 13 is supplied power by a second CPU module power supply similar to CPU module power supply 14.

The inclusion of the CPU module power good detection circuit 15 helps prevent the situation where feedback information about whether the power supply to the CPU is below the operating voltage of the CPU is not communicated to the mother board 20. Therefore, the mother board recognizes if there is insufficient power for the CPU to run (e.g., due to a module power supply failure) and is able to turn off the power supply and protect the rest of the mother board.

In general, the clock 23 on the mother board 20 provides a clock cycle for all components requiring the same, including, typically, the CPU 11. However, as is described above, the clock speed of the clock 23 (i.e. the number of clock cycles per time period) is, typically, not easily adjusted (e.g. without modifying the BIOS or changing components) and, therefore, upgrading the CPU 11 to one which requires a clock speed different from the clock speed for which the mother board clock 23 was configured is, typically, not easily accomplished. The speed of a clock such as clock 23 (which is preferably a phase locked loop rather than a crystal oscillator) is typically dependent on the voltage supplied to it.

The preferred embodiment of the present invention, as shown in FIG. 1, includes a clock speed selector 16 (i.e. as a voltage divider circuit). The clock speed selector 16 is preferably provided power by the mother board 20. The clock speed selector 16 uses the power supplied by the mother board to provide the selection circuit with power which when provided to the clock 23 dictates the speed at which the clock 23 must be set for the particular CPU 11 on the CPU module 10. The clock speed selector 16 enables the CPU module 10 to be manufactured with the proper clock speed selector 16 for the CPU 11 to be provided thereon. Therefore, the preferred embodiment of the present invention enables the clock speed to be automatically set at the speed required by the CPU 11 without manipulation of the BIOS or changing components.

Thus, the preferred embodiment of the present invention provides a CPU module 10 which solves many problems of the prior art. Specifically, the CPU module 10 accommodates a CPU 11 and includes a CPU module power supply 14, a CPU module power good detection circuit 15, and a clock speed selector 16, all of which are integral to the CPU module 10. The CPU module power supply 14 provides the CPU module 10 the ability to convert power supplied to the CPU module 10 by the mother board 20 or internal or external sources 30 and 31 into the power required by the particular CPU 11. The CPU module power good detection circuit 15 provides the CPU module 10 with the ability to communicate to the mother board 20 that the supply of power is below the operating voltage of the CPU 11 (e.g. a power failure or insufficient voltage to the CPU). The clock speed selector 16 provides the CPU module 10 the ability to automatically set the clock speed to that required by the particular CPU 11 on the CPU module 10.

Thus, the CPU module 10 of the present invention facilitates upgrading and/or replacing the CPU of a computer system since the adjustment of all variable parameters affected by such an upgrade or replacement is handled by the CPU module 10 which is assembled and set by the manufacturer. This provides convenience and efficiency to anyone replacing the CPU of a computer system, particularly to end users as the end user need not modify parameters.

While a preferred embodiment of the present invention has been shown and described, various modifications may be made without departing from the scope of the present invention, and all such modifications and equivalents are intended to be covered.

I claim:

1. A computer processing unit module which is insertable into a computer motherboard, said computer motherboard including circuitry which interfaces to said module, and said motherboard coupled to a first power supply which supplies power to the computer motherboard at a first voltage, the module comprising:

a computer processing unit;

a second power supply integral to the module and configured to receive power from the first power supply, said second power supply further configured to supply power to the module at a second voltage; and a power good detection circuit integral to the module and configured to check the power supplied by said second power supply, said power good detection circuit providing a power good output signal indicating whether power supplied by said second power supply complies with at lest one predetermined requirement, wherein said power good signal is configured to be communicated to said computer motherboard so that said motherboard may take protective action when said power good signal indicates that the power supplied by said second power supply fails to meet said predetermined requirement.

2. The module as defined in claim 1, further comprising a clock speed selector circuit integral to the module, said clock speed selector configured to interface via said motherboard to a clock circuit located external to the module, wherein the clock speed selector circuit is configured to provide a clock speed selection signal to said external clock circuit via said motherboard to cause said external clock circuit to set the speed of the clock signal to a speed required by the computer processing unit.

3. A computer processing unit module insertable to a computer circuit board, said computer processing unit module comprising:

a computer processing unit, a power supply integral to the module and configured to receive power from a source external to the module via the circuit board, said integral power supply further configured to supply power to the computer processing unit, and a clock speed selector circuit integral to the module and configured to communicate with a clock circuit located on said circuit board to receive a clock signal for said computer processing unit, and wherein the clock speed selector circuit is configured to provide a clock speed selection signal to said circuit board clock circuit to cause said circuit board clock circuit to set the speed of the clock signal to a speed required by the computer processing unit.

4. A computer processing unit module attachable to a motherboard, said motherboard including circuitry, said module comprising:

a computer processing unit, a power supply integral to the module and configured to receive power from a source external to the module, said power from said external source communicated to said module via the motherboard, said integral power supply further configured to supply power to the computer processing unit, a power good detection circuit integral to the module and configured to check the power supplied from said integral power supply to at least the computer processing unit, said power good detection circuit providing a power good output signal which indicates whether power supplied by said integral power supply complies with at least one computer processing unit requirement, wherein said module is configured to provide said power good signal to said computer motherboard so that said motherboard may take appropriate action when said power good output signal indicates that said power supplied by said integral power supply does not comply with said at least one requirement, and a clock speed selector circuit integral to the module configured to receive a clock for said computer processing unit via said motherboard from a clock circuit external to the module, wherein the clock speed selector circuit is configured to provide a clock speed selection signal to said external clock circuit via said motherboard to cause said external clock circuit to set the speed of the clock signal to a speed required by the computer processing unit.

5. A computer processing unit module connectable to a computer motherboard, said computer motherboard coupled to a first power supply which supplies power to the computer motherboard, the module comprising:

a computer processing unit comprising a core and an input/output interface, a second power supply integral to the module and configured to receive power from said first power supply via said motherboard, said second power supply further configured to supply power to the core of the computer processing unit at a second voltage, a connection configured to couple said input/output interface to the first power supply via said motherboard to supply power to the input/output interface of the computer processing unit at a first voltage, and a power good detection circuit integral to the module and configured to check the power supplied to the module by said second power supply, said power good detection circuit providing a power good output signal which indicates whether power supplied by said second power supply complies with at least one predetermined requirement, wherein said power good signal is couplable to said computer motherboard so that an appropriate response may be taken when said power good signal indicates said power does not comply with said predetermined requirement.

6. The module as defined in claim 5, further comprising a clock speed selector circuit integral to the module, said clock speed selector circuit configured to be coupled to a clock circuit located external to the module and to receive a clock signal for said computer processing unit from said external clock circuit via said motherboard, wherein the clock speed selector circuit is configured to provide a clock speed selection signal to said external clock circuit to cause said external clock circuit to set the speed of the clock to a speed required by the computer processing unit.

7. The module as defined in claim 5, wherein said power good detection circuit is further configured to also check the power supplied to the input/output interface by said first power supply to determine if said power supplied to the input/output interface meets power requirements of said interface.

8. The module as defined in claim 5, wherein said first voltage has a first magnitude and said second voltage has a second magnitude, said second magnitude different from said first magnitude.

* * * * *

UNITED STATES PATENT AND TRADEMARK OFFICE
CERTIFICATE OF CORRECTION

PATENT NO. : 5,838,929
DATED : November 17, 1998
INVENTOR(S) : Roy K. Tanikawa

It is certified that error appears in the above-identified patent and that said Letters Patent is hereby corrected as shown below:

Column 5,
Line 15, change "at last" to -- at least --.

Signed and Sealed this

Twenty-fifth Day of September, 2001

*Attest:*

*Attesting Officer*

NICHOLAS P. GODICI
*Acting Director of the United States Patent and Trademark Office*